United States Patent [19]

Lore et al.

[11] 4,258,634
[45] * Mar. 31, 1981

[54] LAWN COMBINE WITH IMPROVED BRAKE ASSEMBLY

[75] Inventors: Pat Lore, Oakdale; Stanley L. Weber, Westbury, both of N.Y.

[73] Assignee: Lawn-a-Mat Chemical & Equipment Corporation, Westbury, N.Y.

[ * ] Notice: The portion of the term of this patent subsequent to Apr. 8, 1997, has been disclaimed.

[21] Appl. No.: 18,088

[22] Filed: Mar. 6, 1979

Related U.S. Application Data

[63] Continuation-in-part of Ser. No. 926,606, Jul. 21, 1978, Pat. No. 4,196,678.

[51] Int. Cl.³ ............................................. A01C 7/08
[52] U.S. Cl. ..................................... 111/10; 188/22
[58] Field of Search ...................... 111/1, 6, 7, 9, 10, 111/11, 12, 80; 188/20, 22, 29, 74

[56] References Cited

U.S. PATENT DOCUMENTS

| | | | |
|---|---|---|---|
| 251,652 | 12/1881 | Stewart et al. | 188/22 |
| 1,701,188 | 2/1929 | Miller | 188/22 |
| 2,260,110 | 10/1941 | Blohm | 111/1 |
| 2,733,838 | 2/1956 | Neff | 111/1 X |
| 3,395,778 | 8/1968 | Shelby | 188/22 X |

*Primary Examiner*—James R. Feyrer
*Attorney, Agent, or Firm*—Allison C. Collard; Thomas M. Galgano

[57] ABSTRACT

An improved lawn combine includes a frame having a plurality of rotatable wheels, including a pair of spaced-apart rear wheels, supporting and coupled to the frame, drive-actuated feed devices mounted on the frame for feeding materials in prescribed dosages to the lawn surface and drive means mounted on the frame for propelling at least one of the wheels of the frame and for actuating the aerator and the feed devices. The combine further includes a pair of manually-operable brake assemblies, each of which is disposed for cooperation with one of the rear wheels. Each of the brake assemblies is movable between a non-engaged and engaged position relative to the associated rear wheel, in the latter position of which it at least frictionally retards rotation of the associated rear wheel.

7 Claims, 5 Drawing Figures

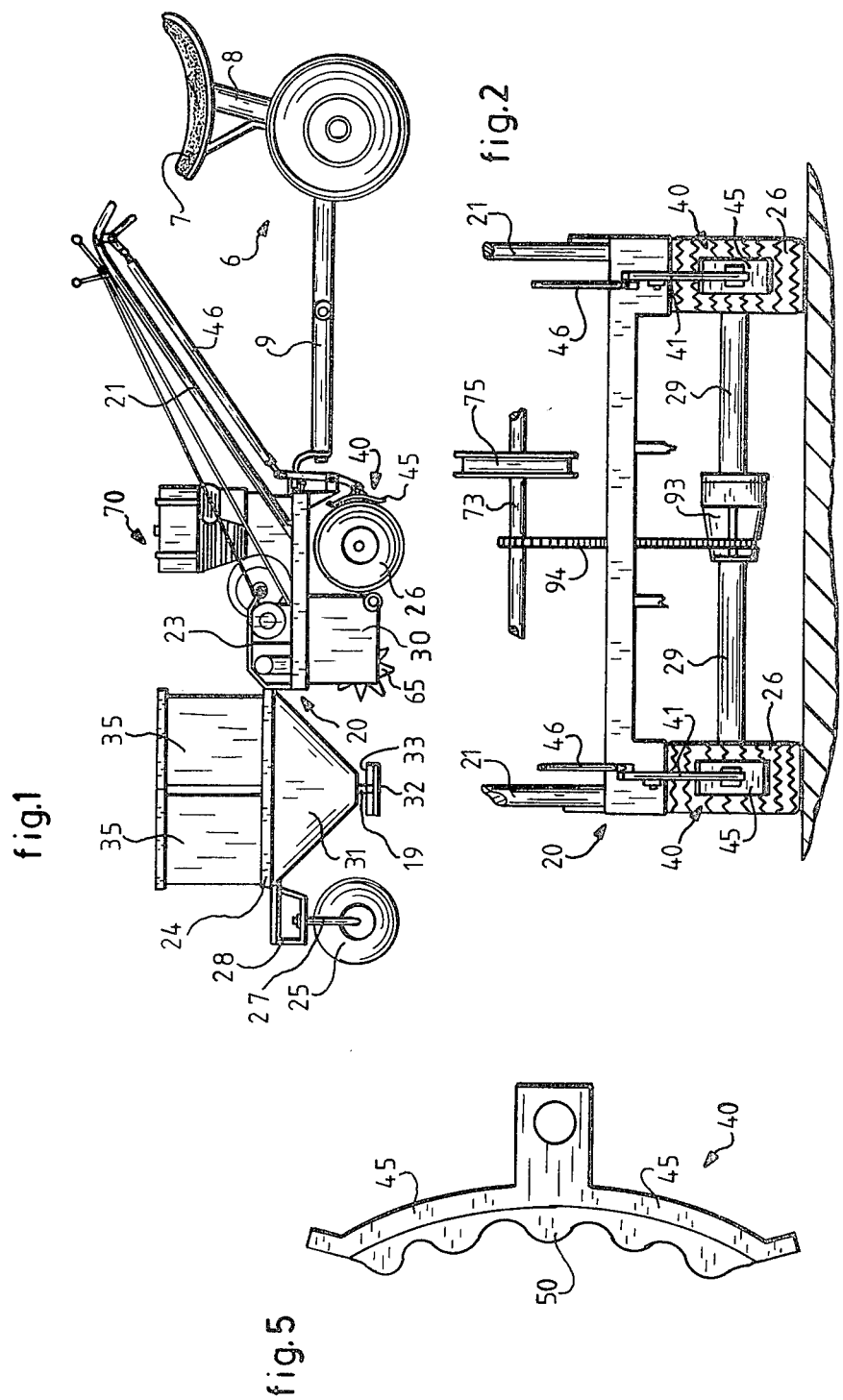

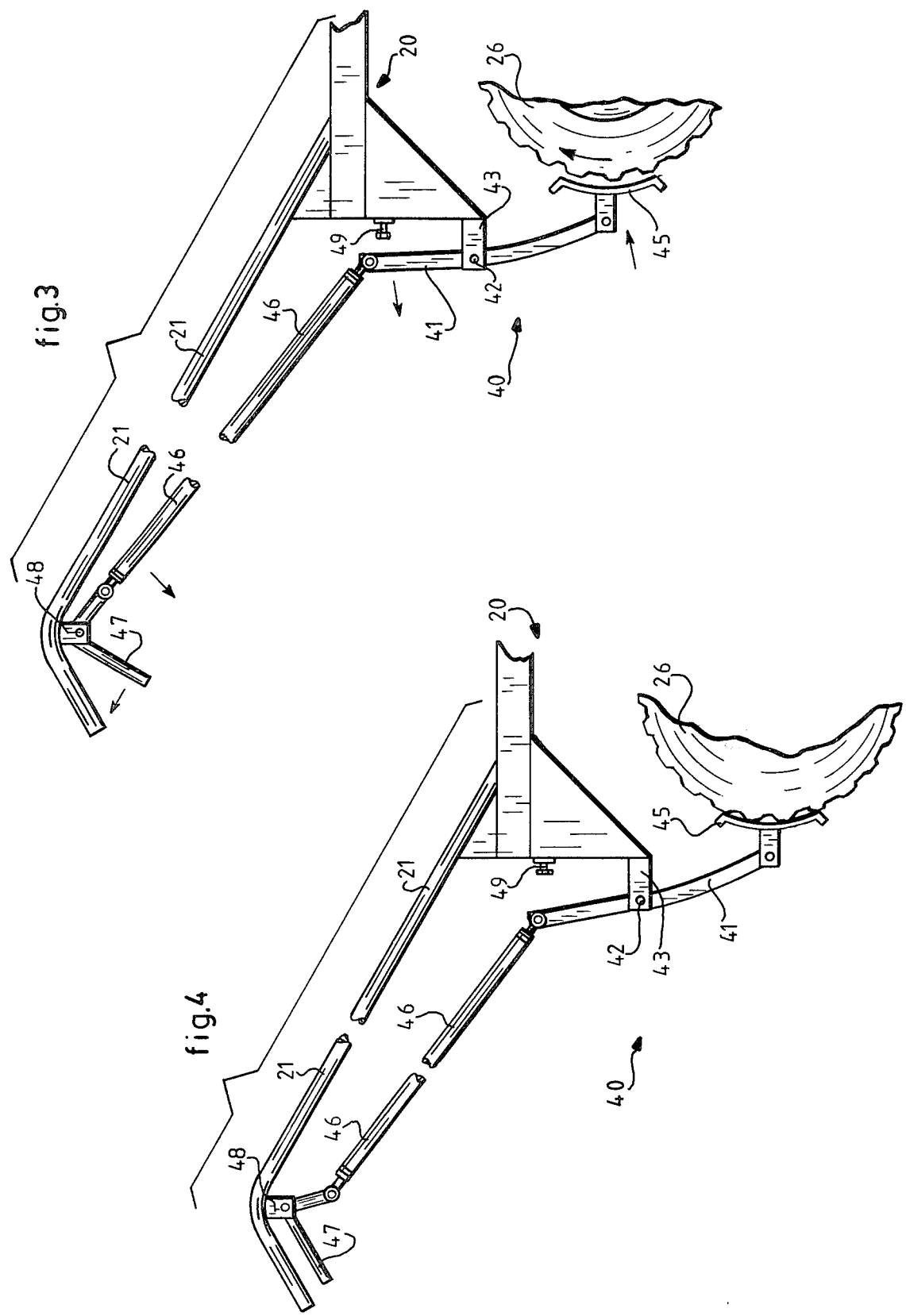

LAWN COMBINE WITH IMPROVED BRAKE ASSEMBLY

This application is a continuation-in-part application of Ser. No. 926,606, filed July 21, 1978 (now U.S. Pat. No. 4,196,678).

This invention relates to a lawn combine. More particularly, it relates to a self-powered lawn combine which seeds, fertilizes, aerates, and applies herbicides, insecticides, and fungicides in prescribed dosages in one sweep across the lawn and has an improved brake assembly.

Various types of lawn care equipment are widely used by homeowners and gardeners for maintaining healthy and weed-free lawns. For example, there are a variety of hand-driven seeders and spreaders for applying seed as well as fertilizers, insecticides, etc. to the lawn. There are also a number of hand-driven aerators which have a spiked roller and which are used to aerate the lawn. However, these have been found to be disadvantageous since each of the tasks performed must be done separately, requiring a number of time-consuming sweeps across the lawn.

Attempts have been made to alleviate these time-consuming tasks by incorporating these various garden devices into one unit which would be driven by a tractor so that all of the various gardening tasks could be accomplished in one sweep of the lawn. However, these attempts have also been found to be unsatisfactory because for typical lawns such a unit is too large and cumbersome to maneuver in tight corners and other narrow or restricted areas of the lawn.

Accordingly, it is an object of the present invention to provide a novel, self-powered lawn combine which aerates, and applies prescribed dosages of seed, insecticides, fertilizer, herbicides and fungicides in one sweep across the lawn.

It is also an object of the present invention to provide such a novel, self-powered lawn combine which is relatively simple in design, compact, durable, economical to fabricate and easy to use.

It is a more particular object of the present invention to provide a novel lawn combine having the foregoing attributes and characteristics which has an improved brake assembly which enhances maneuverability of the combine in tight corners and other narrow or restricted areas of the lawn without causing damage to the lawn surface.

Certain of the foregoing and related objects are readily attained in accordance with the present invention by the provision of a lawn combine including a frame having a plurality of rotatable wheels, including a pair of spaced-apart rear wheels, supporting and coupled to the frame, a drive-actuated rotatable aerator which is mounted on the frame, drive-actuated feed means mounted on the frame for feeding materials in prescribed dosages to the lawn surface in an area generally beneath the frame, and drive means mounted on the frame for propelling at least one of the wheels of the frame and for actuating the aerator and the feed means. The combine further includes a pair of manually-operable brake assemblies, each of which is disposed for cooperation with one of the rear wheels. Each of the brake assemblies is movable between a non-engaged and engaged position relative to the associated rear wheel, in the latter position of which it at least frictionally retards rotation of the associated rear wheel.

Preferably, each of the brake assemblies includes an arcuate brake shoe pivotably supported on the frame for movement between a non-engaged and engaged position relative to the associated rear wheel. Most advantageously, the brake shoe has a smooth lining which is disposed for engagement with the rear wheel. In an alternate embodiment, the lining may be covered with a friction-enhancing material.

In a preferred embodiment of the invention at least one handle is coupled to, and extends rearwardly from, the frame and each of the brake assemblies includes a hand lever pivotably supported on the handle which is movable between an activating and deactivating pivotable position and coupling means for coupling the hand lever to the associated brake shoe of the respective brake assembly. This permits the hand lever to control movement of the associated brake shoe between the non-engaged and engaged positions thereof.

Most desirably, each of the hand levers has a generally L-shaped configuration. Most advantageously, the coupling means includes a pair of elongated pivotable members including a first member having an upper end, a central section pivotably coupled to the frame and a lower end coupled to the brake shoe, and a second member having a lower end pivotably coupled to the upper end of the first member and an upper end pivotably coupled to the hand lever.

Other objects and features of the present invention will become apparent when taken in conjunction with the accompanying drawings which illustrate several embodiments of the invention. It is to be understood, however, that the drawings are designed for the purposes of illustration only, and are not intended as a definition of the limits and scope of the invention.

In the drawings, wherein similar reference characters denote similar elements throughout the several views:

FIG. 1 is a side elevational view of a novel lawn combine with an improved brake assembly embodying the present invention;

FIG. 2 is an enlarged, fragmentarily-illustrated, rear end view of the combine shown in FIG. 1, with the sulky and other combine parts removed or broken away;

FIG. 3 is an enlarged, fragmentarily-illustrated side elevational view of the lawn combine showing the brake assembly in a non-engaged, non-operative position.

FIG. 4 is an enlarged, fragmentarily-illustrated, side elevational view similar to that of FIG. 2, but showing the brake assembly in an engaged, operative position; and FIG. 5 is an enlarged, side elevational view of an alternate embodiment of a brake shoe of the lawn combine brake assembly.

Turning now in detail to the drawings, and, in particular, FIGS. 1 and 2 thereof, therein illustrated is a novel lawn combine with an improved brake assembly embodying the present invention which includes an inverted, generally U-shaped main frame 20. Two spaced-apart handles 21 are connected to the rear end of the main frame 20 and extend rearwardly and upwardly therefrom.

Main frame 20 has secured to its forward edge a pair of rearwardly-projecting, hinged flaps 23 (only one of which is viewable) which are normally disposed to cover the lawn combine drive assembly (which will be discussed in greater detail hereinbelow) and a generally flat, horizontally-disposed, rectangular auxiliary frame 24. Main frame 20 and auxiliary frame 24 are supported by a front wheel 25 and two rear wheels 26. Front wheel 25 is rotatably mounted between the arms of a yoke 27, the upper end of which is pivotably coupled to a trough-shaped forward portion 28 of auxiliary frame 24 to permit free turning and rotation of front wheel 25. Rear wheels 26 are supported on the opposite ends of a rear axle 29 which is coupled (by means not shown) to main frame 20, rearwardly of its vertical sidewalls 30.

Depending from auxiliary frame 24 is a downwardly-tapered main hopper 31 having a lower dispensing aperture (not shown) through which lawn care materials (i.e., seed fertilizers, insecticides, herbicides, fungicides, etc.) are dispensed onto the lawn beneath frame 24. To facilitate uniform spreading and application of the lawn care materials, a rotatable platform 32 having radially extending vanes 33 on the upper surface thereof (FIG. 13) is disposed beneath the dispensing aperture of main hopper 31. Platform 32 is secured to the lower end of a motor drive shaft 19 coupled to a battery-driven electric motor (not shown) mounted on auxiliary frame 24 and activated and deactivated by an on-off toggle switch (not shown). Activation of the motor will effect rotation of shaft 19 and, in turn, platform 32 so that lawn care material discharged from hopper 31 and collected on platform 32 will be propelled radially outwardly therefrom in a uniform pattern, under the action of vanes 33, over an area of the lawn generally beneath and adjacent to auxiliary frame 24.

To supply different lawn care products to main hopper 31, four generally rectangular auxiliary hoppers or bins 35 (only two of which are shown) consisting of a forward pair and a rearward pair arranged side by side, are demountably secured atop auxiliary frame 24, above main hopper 31. In order to feed lawn care products in prescribed dosages to main hopper 31 and, in turn, the lawn, regulator assemblies (not shown) are provided which are associated with each of the pairs of bins 35 to regulate the amount of material fed from each bin 35 into main hopper 31.

The lawn combine additionally includes a generally drum-shaped aerator 65 which consists of a plurality of spike rings having V-shaped spikes extending radially outwardly therefrom. The aerator 65 is pivotably supported on opposite sidewalls 30 of main frame 20 and, as a result of this pivotal mounting, it may be moved between a lower engaged position (not shown) in which the spikes thereof dig into the lawn, and an upper or raised, non-engaged position (FIG. 1).

Mounted atop of main frame 20 is a conventional gas-powered engine 70 which drives a pulley 75 affixed to a freely rotatable main drive shaft 73 supported atop main frame 20 (by means not shown). A sprocket (not viewable) is fixed on shaft 73 and is coupled by means of a chain 94 to a sprocket (not viewable) of a differential 93 mounted on rear axle 29 so as to transmit drive power to rear wheels 26. A more detailed description of the aerator, the lawn care material feed assembly and the drive assembly and their manner operation is set forth in U.S. Pat. No. 4,196,678, the subject matter of which is incorporated herein by reference thereto.

Disposed immediately behind main frame 20 is a sulky 6 having a wheel-supported frame 8 on which is mounted a seat 7. Frame 8 has a forwardly-extending horizontally-disposed center bar 9 pivotably secured to the rear of main frame 20 to permit lateral pivotal movement of sulky 6 upon turning of the combine during operation. This is an optional piece of equipment which is recommended for large lawns.

As seen more clearly in FIGS. 2-4, the lawn combine additionally includes a friction brake assembly 40 associated with each of the rear wheels 26. Each of the brake assemblies 40 includes a generally vertically-disposed elongated bar or rod 41 pivotably attached at a center point thereof by means of a bolt 42 to a flange 43 projecting rearwardly from the main frame 20. The lower end of bar 41 has a forwardly projecting flat, arcuate brake shoe 45 made of metal secured thereto which is disposed to engage a circumferential portion of the respective rear wheel 26 when activated. The upper end of bar 41 is pivotably coupled to the lower end of a rod or bar 46 which, in turn, has an upper end which is pivotably secured to the shorter leg of a generally L-shaped brake hand lever or handle 47. At the merger point of its two legs, brake handle 47 is pivotably supported from a flange 48 depending downwardly from the rear end of handle 21. An adjustable pivot stop 49 is also mounted on main frame 20, extending rearwardly therefrom, and it serves to limit the forward pivoting of the upper end of bar 41.

Turning now in more detail to the operation of the friction brake assemblies 40, when it is desired to make a right turn with the lawn combine, the operator pulls the longer leg of brake handle 47 of the right handle 21 upwardly and rearwardly as shown by the arrow in FIG. 3. This, in turn, causes downward and rearward pivoting of the shorter leg of brake handle 47 and rod 46. The movement of rod 46, in turn, causes the upper end of bar 41 to be pivoted in a rearward direction. Consequently, the lower end of bar 41 is pivoted forwardly and brake shoe 45 is frictionally applied against the right rear wheel inhibiting rotation thereof. As a result thereof, and the unimpeded rotation of the left rear wheel, this causes the combine to execute a right turn.

It should be noted in this regard that, as a result of the smooth surface of brake shoe 45, there will be some slipping or movement of the right wheel even when the friction brake is applied (unless a very strong holding force is applied to the brake handle). However, this has been found to be extremely advantageous since the abrupt stopping of one wheel may tear into the lawn surface. In addition, a relatively small turning radius is still achieved and little effort is needed to effect a proper turn.

In the case where it is desired to make a left hand turn, the same procedure would be followed with respect to the brake assembly of the left handle. When it is desired to stop the combine, it is typically advantageous to simply disconnect the power drive to the wheels. However, it would also be possible to use the two friction hand brakes for momentary stops.

FIG. 5 illustrates an alternate embodiment of brake shoe 45. In this case, brake shoe 45 is provided with a friction-enhancing undulating lining 50 which may be made, for example, of rubber. This embodiment would appear desirable for those cases where sure and abrupt stopping of the rear wheels would not cause lawn damage, or where a greater holding force is required. Of course, other types and configurations of friction-enhancing linings could be employed.

Thus, while only several embodiments of the present invention have been shown and described, it will be obvious to those persons of ordinary skill in the art, that many changes and modifications may be made thereunto, without departing from the spirit and scope of the invention.

What is claimed is:

1. A lawn combine, comprising:

a frame including a plurality of rotatable wheels supporting and coupled to said frame;

a drive-actuated rotatable aerator movably mounted on said frame for movement between a lower operative position, in which it is disposed for engagement with a lawn surface and an upper raised, inoperative position, in which it is disposed for non-engagement with the lawn surface;

means for moving said aerator between said operative and inoperative positions thereof, mounted on said frame;

drive-actuated feed means mounted on said frame for feeding materials in prescribed dosages to the lawn surface in an area generally beneath said frame, said feed means comprising a main hopper mounted on said frame having a lower opening through which material fed to said hopper is dispensed and a plurality of bins mounted on said frame, each of which has a lower slot-shaped dispensing aperture for feeding a particular material to said main hopper, said bins each including drive-actuated regulator means for metering material fed thereto in prescribed dosages to said main hopper, said regulator means each including a rotatable, cylindrical sleeve having a plurality of longitudinally-extending slots formed therethrough spaced about the periphery thereof, which sleeve is rotatably supported on said frame such that at least a portion thereof is disposed beneath one of said slot-shaped dispensing apertures parallel to the longitudinal axis thereof, said slots being movable in a rotary fashion between a loading position, in which the slots oppose said slot-shaped aperture, and a discharge position, in which material fed into said slots is discharged into said hopper, said regulator means also each including a plurality of interconnected rods, each of which is slidably mounted in one of said slots of said sleeve, said rods having a first portion having an upper surface which lies substantially flush with the outer circumferential surface of said sleeve and a second portion having an upper surface which lies substantially flush with the inner circumferential surface of said sleeve, said rods being movable between a first end position, in which said first portion thereof is disposed beneath said slot-shaped aperture, and a second end position, in which said second portion thereof is disposed beneath said slot-shaped aperture to thereby respectively permit and stop feeding of material to said hopper, said regulator means each also including control means for controlling the position of said rods;

drive means mounted on said frame for propelling at least one of the wheels of said frame and for actuating said aerator and said feed means; and a pair of manually-operable, frictional brake assemblies, each of which is disposed for cooperation with a different one of said rear wheels, each of said brake assemblies being movable between a non-engaged and engaged position relative to the associated rear wheel, in the latter position of which it at least frictionally retards rotation of the associated rear wheel.

2. The lawn combine according to claim 1, wherein each of said brake assemblies include an arcuate brake shoe pivotably supported on said frame for movement between a non-engaged and engaged position relative to the associated rear wheel.

3. The lawn combine according to claim 2, wherein said brake shoe has a smooth lining which is disposed for engagement with said rear wheel.

4. The lawn combine according to claim 3, wherein said lining is covered with a friction-enhancing material.

5. The lawn combine according to claim 2, wherein said frame has at least one handle coupled to and extending rearwardly therefrom, and wherein each of said brake assemblies includes a hand lever pivotably supported on said handle which is movable between an activating and deactivating pivotable position and coupling means for coupling said hand lever to the associated brake shoe of the respective brake assembly so as to permit said hand lever to control movement of said associated brake shoe between said non-engaged and engaged positions thereof.

6. The lawn combine according to claim 5, wherein each of said hand levers has a generally L-shaped configuration.

7. The lawn combine according to claim 5, wherein said coupling means comprises a pair of elongated pivotable members including a first member having an upper end, a central section pivotably coupled to said frame and a lower end coupled to said brake shoe, and a second member having a lower end pivotably coupled to said upper end of said first member and an upper end pivotably coupled to said hand lever.

* * * * *